United States Patent
Pan et al.

(10) Patent No.: US 10,689,404 B1
(45) Date of Patent: Jun. 23, 2020

(54) PREPARATION METHOD OF TETRABORONIC ACID COMPOUNDS, AND TETRABORONIC ACID COMPOUNDS

(71) Applicant: Tamkang University, New Taipei (TW)

(72) Inventors: Po-Shen Pan, New Taipei (TW); Shuo-Bei Qiu, New Taipei (TW); Yi-Wei Chen, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 0 days.

(21) Appl. No.: 16/439,234

(22) Filed: Jun. 12, 2019

(30) Foreign Application Priority Data

Mar. 26, 2019 (TW) .............................. 108110557 A

(51) Int. Cl.
*C07F 5/02* (2006.01)

(52) U.S. Cl.
CPC .................................. *C07F 5/025* (2013.01)

(58) Field of Classification Search
CPC ....................................................... C07F 5/025
See application file for complete search history.

(56) References Cited

PUBLICATIONS

Hiratsuka et al. "Boron neutron capture therapy for vulvar melanoma and genital extramammary Paget's disease with curative responses" Cancer Communications, 2018, vol. 38, Article 38.*

* cited by examiner

*Primary Examiner* — Joseph R Kosack
(74) *Attorney, Agent, or Firm* — Birch, Stewart, Kolasch & Birch, LLP

(57) ABSTRACT

A preparation method of tetraboronic acid compounds includes mixing aldehydes with amines and dissolving them in a solvent to obtain a first solution, stirring the first solution, adding carboxylic acid and isocyanide to obtain a second solution, heating the second solution to obtain a first product, extracting and purifying the first product to obtain tetraboronate ester compounds, and executing a deprotection reaction on the tetraboronate ester compounds under heating by microwave to obtain a second product. The second product contains tetraboronic acid compounds, and the tetraboronic acid compounds have the structure as shown in formula (I).

18 Claims, 3 Drawing Sheets
(2 of 3 Drawing Sheet(s) Filed in Color)

PREPARATION METHOD OF TETRABORONIC ACID COMPOUNDS, AND TETRABORONIC ACID COMPOUNDS

CROSS-REFERENCE TO RELATED APPLICATION

This non-provisional application claims priority under 35 U.S.C. § 119(a) to Patent Application No. 108110557 in Taiwan, R.O.C. on Mar. 26, 2019, the entire contents of which are hereby incorporated by reference.

BACKGROUND

Technical Field

The present invention relates to preparation of a boron-containing compound, and in particular, to a preparation method of a tetraboronic acid (same as tetraboric acid) compound and a tetraboronic acid compound.

Related Art

Since most chemotherapies are accompanied with serious side effects, finding an alternative cancer therapy is an important topic in cancer medical research. In recent years, Boron Neutron Capture Therapy (BNCT) has attracted much attention as a novel cancer therapy of a radioisotope.

The principle of BNCT is to inject a boron-containing compound containing a boron 10 isotope ($^{10}B$) into cancer cells, and irradiate low-energy neutron beams, so that $^{10}B$ atoms in the boron-containing compound generate low-penetration-degree rays ($^7Li$ and $^4He$) after undergoing a nuclear fission reaction to damage the cancer cells. Since the cell penetration ability of the low-penetration-degree rays is about equal to the diameter of one cell, surrounding normal cell tissues will not be affected while the cancer cells are damaged.

The key to the success of BNCT is to have an uptake of boron-containing compound in addition to thermal neutron beams. After a boron-containing drug is intravenously injected into a human body, the content of boron entering tumor cells must be higher than the content of boron of normal tissue cells. At present, the requirement of clinical trials is that the content of boron of tumor cells must be 2.5 times or above than that of normal tissue cells. Boronophenylalanine (BPA), a common boron-containing compound, has been clinically used for many years. However, BPA only possess one boronic acid group, which limit its ability to deliver sufficient amount of boron to the target tumorous tissues in clinical application.

SUMMARY

In view of the above, the present invention provides an efficient synthetic strategy to prepare a peptide-like tetrabonic acid compound and the invented compounds that can be used as the potential BNCT agent. The tetraboronate ester compound is synthesized by an Ugi reaction under microwave-assistance condition, and later converted to the corresponding tetraboronic acid product via a second set of microwave-assistance condition. Comparing to the conventional heating method, The abovementioned microwave condition can efficiently reduce the overall reaction time. This invention provides a general protocols to generate a tetraboronate ester product(s) and also a global deprotection strategy to generate the corresponding tetraboronic acid product(s). Compounds provided by the present invention have higher content of boron atoms per molecule than the clinical used BPA.

In one embodiment, the preparation method of a tetraboronic acid compound includes: mixing an aldehyde with an amine and dissolving in a solvent to obtain a first solution; stirring the first solution; adding a carboxylic acid and an isocyanide to obtain a second solution; heating the second solution to obtain a first product; extracting and purifying the first product to obtain a tetraboronate ester compound, the amine having a protective group of R2 and the protective group of R2 being 4-phenylboronic acid pinacol ester, the aldehyde having a protective group of R3 and the protective group of R3 being 3-phenylboronic acid pinacol ester, 4-phenylboronic acid pinacol ester or 2-fluoro-5-phenylboronic acid pinacol ester, the carboxylic acid having a protective group of R1 and the protective group of R1 being 4-phenylboronic acid pinacol ester or 2-fluoro-4-phenylboronic acid pinacol ester, the isocyanide having a protective group of R4 and the protective group of R4 being 3-benzylboronic acid, 4-benzylboronic acid or 2-fluoro-4-benzylboronic acid; and conducting a deprotection reaction on the tetraboronate ester compound under heating by microwave to obtain a second product, the second product containing a tetraboronic acid compound and the tetraboronic acid compound has a structure in Formula (I). R1 is 4-phenylboronic acid or 2-fluoro-4-phenylboronic acid, R2 is 4-phenylboronic acid, R3 is 3-phenylboronic acid, 4-phenylboronic acid or 2-fluoro-5-phenylboronic acid, and R4 is 3-benzylboronic acid, 4-benzylboronic acid, or 2-fluoro-4-benzylboronic acid.

In one embodiment, a tetraboronic acid compound has the structure in Formula (I), R1 to R4 of the compound are functional groups containing boric acid, R1 is 4-phenylboronic acid or 2-fluoro-4-phenylboronic acid, R2 is 4-phenylboronic acid, R3 is 3-phenylboronic acid, 4-phenylboronic acid, or 2-fluoro-5-phenylboronic acid, and R4 is 3-benzylboronic acid, 4-benzylboronic acid, or 2-fluoro-4-benzylboronic acid.

In summary, in the preparation method of a tetraboronic acid compound and the tetraboronic acid compound according to any one of the embodiments of the present invention, the aldehyde, amine, isocyanide, and carboxylic acid having boron esters are subjected to an Ugi reaction, and the boron ester functional groups are deprotected to form boronic acid functional groups, thereby preparing the tetraboronic acid compound having four boron atoms. The foregoing Ugi reaction and the deprotection reaction further increase the reaction rate and the yield of the product efficiently by the microwave heating reaction.

BRIEF DESCRIPTION OF THE DRAWINGS

The patent or application file contains at least one color drawing. Copies of this patent or patent application publication with color drawing will be provided by the USPTO upon request and payment of the necessary fee.

DETAILED DESCRIPTION

Unless otherwise defined, for a person of ordinary skill in the art, all technical and scientific terms used herein have the same meanings as those that are commonly known.

Figure 1:
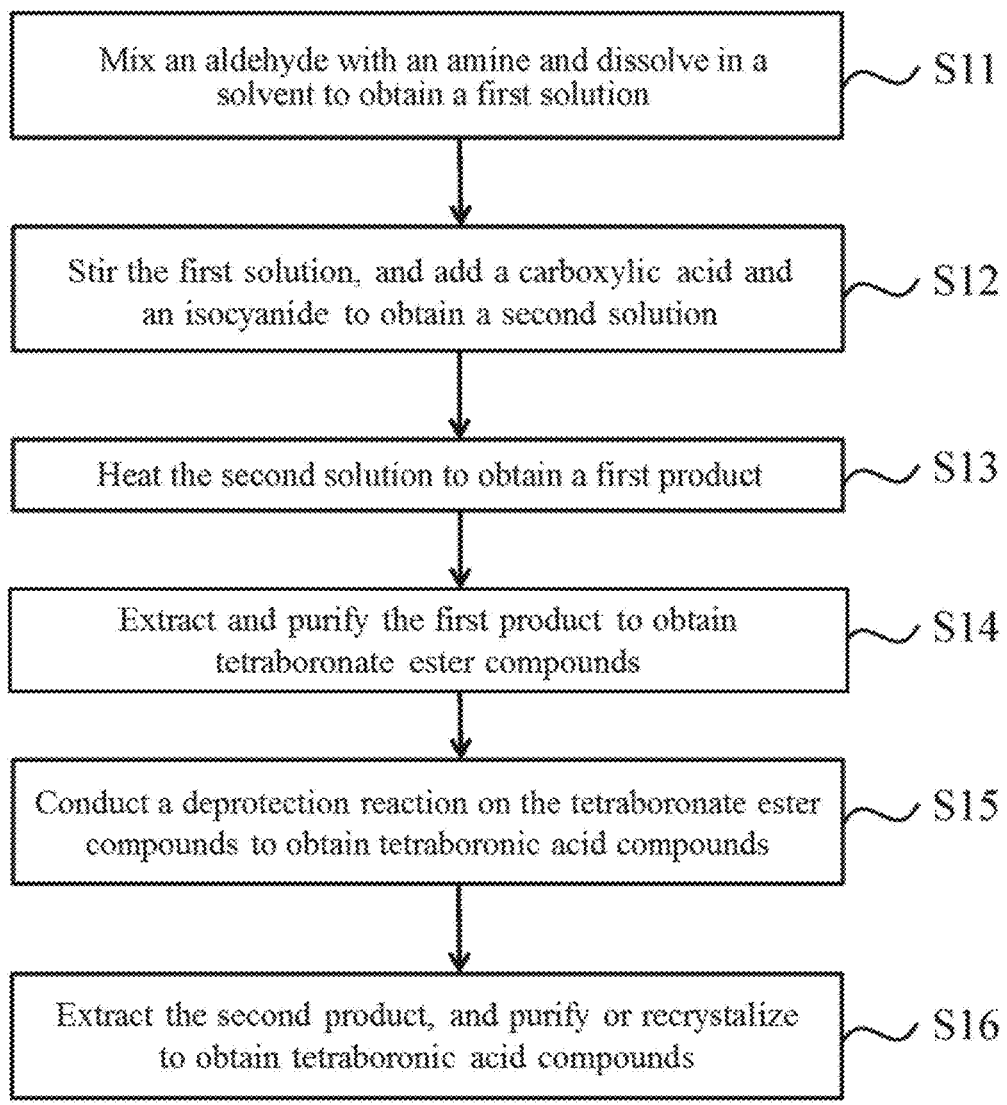
FIG. 1 is a schematic diagram of a preparation procedure of a tetraboronic acid compound according to an embodiment of the present invention.

Referring to FIG. 1, FIG. 1 is a schematic diagram of a preparation procedure of a tetraboronic acid compound according to an embodiment of the present invention. Herein, the tetraboronic acid compound has a structure in Formula (I)

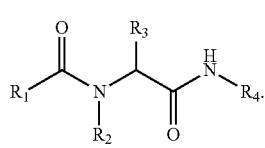

R1 is 4-phenylboronic acid or 2-fluoro-4-phenylboronic acid, R2 is 4-phenylboronic acid, R3 is 3-phenylboronic acid, 4-phenylboronic acid, or 2-fluoro-5-phenylboronic acid, and R4 is 3-benzylboronic acid, 4-benzylboronic acid, or 2-fluoro-4-benzylboronic acid.

First, an aldehyde and an amine are mixed and dissolved in a solvent to obtain a first solution (step S11), and both the aldehyde and the amine have boronate ester functional groups. The amine has a protective group of R2 and the protective group of R2 is phenylboronic acid pinacol ester, and the aldehyde has a protective group of R3 and the protective group of R3 is 3-phenylboronic acid pinacol ester, 4-phenylboronic acid pinacol ester, or 2-fluoro-5-phenylboronic acid pinacol ester.

In some embodiments, the aldehyde and the amine are mixed and dissolved in the solvent, then placed in a focused microwave reactor (Model: CEM Discover System-Benchmate), and subjected to a microwave heating reaction in a first microwave condition. The first microwave condition includes 60° C., 150 W, and a high rotating speed, and reaction time is 15 minutes, and the rotating speed is set to High according to the machine model.

Further, the solvent may be a nonpolar solvent, a polar aprotic solvent, a polar protic solvent, or the like. In some embodiments, the solvent may be, but is not limited to, trifluoroethanol, water, methanol, diethyl ether, and dichloromethane. In one embodiment, the solvent is preferably trifluoroethanol, thereby increasing the yield relatively. Further, the concentration of the solvent is 1 molar concentration (M).

After the first solution is uniformly stirred, a carboxylic acid and an isocyanide are added to obtain a second solution (step S12), and both the carboxylic acid and isocyanide have boron ester functional groups. The carboxylic acid has a protective group of R1 and the protective group of R1 is 4-phenylboronic acid pinacol ester or 2-fluoro-4-phenylboronic acid pinacol ester, and the isocyanide has a protective group of R4 and the protective group of R4 is 3-benzylboronic acid, 4-benzylboronic acid, or 2-fluoro-4-benzylboronic acid.

The second solution is heated to obtain a first product (step S13), and the first product includes a tetraboronate ester compound. In some embodiments, the first solution is added with the carboxylic acid and the isocyanide to form the second solution, the second solution is placed in the focused microwave reactor and subjected to a microwave heating reaction in a second microwave condition. In some embodiments, the second microwave condition includes 45° C. or 65° C., 150 W, and a high rotating speed, and reaction time is 1 to 3 hours. The second microwave condition includes preferably 65° C., 150 W, and a high rotating speed, and the reaction time is 2 hours.

Herein, the aldehyde, amine, carboxylic acid, and isocyanide having the boron ester functional groups are mixed and subjected to an Ugi reaction (i.e., steps S11 to S13), and the reaction Formula (i) is as follows:

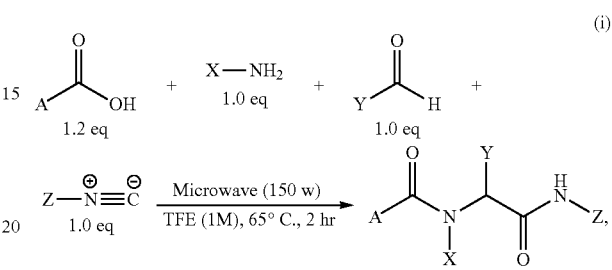

in the reaction Formula (i), A, X, Y, and Z have boron ester functional groups and are a protective group of R1 to R4 respectively. A is 4-phenylboronic acid pinacol ester or 2-fluoro-4-phenylboronic acid pinacol ester, X is phenylboronic acid pinacol ester, and Y is 3-phenylboronic acid pinacol ester, 4-phenylboronic acid pinacol ester, or 2-fluoro-5-phenylboronic acid pinacol ester, and Z is 3-benzylboronic acid, 4-benzylboronic acid or 2-fluoro-4-benzylboronic acid.

Steps S11 to S13 are also referred to as an Ugi reaction. In the Ugi reaction, the aldehyde and the amine react with each other to dehydrate to form an imine compound, and then the imine compound reacts with the carboxylic acid and the isocyanide to form a compound having a peptoid structure.

Referring to FIG. 1 again, the first product obtained by the Ugi reaction is extracted and purified to obtain a clean tetraboronate ester compound (step S14). In some embodiments, the first product is extracted using a 1.0 M hydrochloric acid aqueous solution, a saturated sodium hydrogen carbonate aqueous solution, and a saturated salt solution respectively, and then, purified by column chromatography using ethyl acetate and n-hexane as eluents. The purified product is then ultrasonically oscillated with n-hexane (model: DELTA® DC80) to obtain the clean tetraboronate ester compound.

Following step S14, the obtained tetraboronate ester compound is subjected to a deprotection reaction to obtain a second product (step S15). The second product contains a tetraboronic acid compound. Next, after the second product is obtained, a clean tetraboronic acid compound can be obtained by extraction, purification, or recrystallization (step S16)

In some embodiments, the microwave heating is used to assist the deprotection reaction, and the microwave heating assistance is to use the focused microwave reactor and set a third microwave condition to apply a microwave and conduct the deprotection reaction by applying the microwave. Herein, the third microwave condition includes 45° C., 150 W, and a high rotating speed, and reaction time of the deprotection reaction is 30 minutes.

The deprotection reaction is to deprotect a boronate ester functional group on the tetraboronate ester compound to be a boronic acid functional group, to form a tetraboronic acid functional group having the structure in Formula (I). The reaction Formula (ii) involved in the deprotection reaction is as follows:

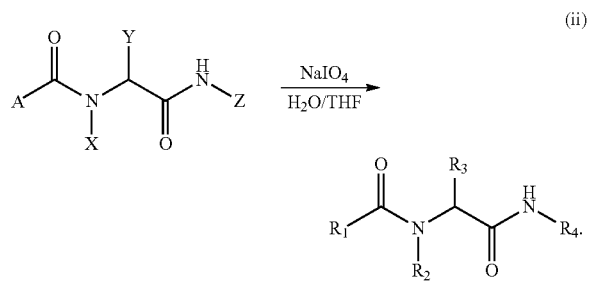

Thereby, the A functional group is deprotected to be the R1 functional group, the X functional group is deprotected to be the R2 functional group, the Y functional group is deprotected to be the R3 functional group, and the Z functional group is deprotected to be the R4 functional group.

In one embodiment, the deprotection reaction is a reaction of deprotecting the boron ester functional group to be the boronic acid functional group by sodium periodate ($NaIO_4$), water, tetrahydrofuran (THF), and the tetraboronate ester compound through microwave heating assistance. The second product obtained after the deprotection reaction is subjected to extraction, centrifugation, and freeze-drying with ethyl acetate and the 1 M aqueous hydrochloric acid solution to obtain a clean tetraboronic acid compound. In the extraction step, by cleaning an organic layer with the saturated salt solution, the unreacted sodium periodate can be thoroughly removed, and the sodium periodate is biologically toxic. In addition, after being microwave heating assistance, the four boron ester functional groups can be simultaneously deprotected to be boronic acid functional groups. In the embodiment, the tetraboronate ester compound and the sodium periodate are dissolved in tetrahydrofuran and water (1M, THF:water=4:1), and placed in a microwave reactor, the microwave condition is set to 45° C., 150 W, and a high rotating speed, and the reaction time is 30 minutes. A crude product is taken out to a round-bottomed flask and the 1 M aqueous hydrochloric acid solution and a stir bar are added to react for 8 hours. After the reaction, the resulting product is transferred to a separating funnel, an aqueous layer is extracted with ethyl acetate and the organic layer is cleaned with the saturated salt solution, and anhydrous magnesium sulfate is added to the organic layer to remove water; after a solid (such as aqueous magnesium sulfate) is removed from the organic layer by suction filtration, the liquid is concentrated under decompression to remove ethyl acetate, and the crude product is dissolved in methanol and placed in a centrifuge tube; water is added until the solid (such as impurities) is separated out, the crude product is centrifuged by a centrifugal machine and the solid is removed by suction filtration. A filtrate is dried via a freeze dryer (model: UNISS FDM-5) to obtain a tetraboronic acid compound.

In another embodiment, the deprotection reaction is to enable the boron ester functional group of the tetraboronate ester compound to react with potassium hydrogen fluoride ($KHF_2$) to form a potassium organotrifluoroborate salt, followed by Soxhlet extraction, and recrystallize by using diethyl ether and acetone to form a potassium trifluoroborate ($BF_3K$) compound. Next, a hydrolysis reaction is carried out by using silicon dioxide ($SiO_2$) to obtain a tetraboronic acid compound. In the foregoing embodiment, the tetraboronate ester compound and the potassium hydrogen fluoride are dissolved in methanol and water (i.e., 0.25 M methanol) to undergo the reaction, and the reaction time is 8 hours. After the reaction, the solvent is removed by the freeze dryer, the Soxhlet extraction is carried out with acetone for 2 days, and the extracted acetone solution contains the potassium organotrifluoroborate salt. The acetone is drained. Diethyl ether and acetone are utilized for purifying by recrystallization to form a clean potassium organotrifluoroborate salt. Next, the silicon dioxide is added to the potassium organotrifluoroborate salt and dissolved in ethyl acetate and water (i.e., 0.25 M ethyl acetate) to be subjected to a hydrolysis reaction, and the reaction time is 8 hours. After the silicon dioxide is removed by suction filtration, an ethyl acetate organic layer is extracted from a filtrate with water and the saturated salt aqueous solution, and the organic layer is drained to obtain a tetraboronic acid compound.

In yet another embodiment, the deprotection reaction is to convert the boron ester functional group of a tetraboronate ester compound to an R-B (DEA) organic salt by diethanolamine (DEA) and allow the R-B (DEA) organic salt to precipitate and separate out in diethyl ether. After a solid salt is obtained by suction filtration, a hydrolysis reaction is conducted by the 0.1 M aqueous hydrochloric acid solution to form a tetraboronic acid compound. In the embodiment, after the stir bar, the tetraboronate ester compound and 1 M diethyl ether are added to the round-bottomed flask to react for 30 seconds, the diethanolamine (DEA) is added to react at a room temperature for 3 hours. In the reaction process, the reaction situation is tracked by thin layer chromatography (TLC) (ethyl acetate:n-hexane=1:1). After the tetraboronate ester compound completely reacts, a filtrate is removed by suction filtration, a solid after suction filtration is dissolved in methanol, and the methanol is removed by concentration under decompression. Next, a trace amount of ultrapure water is added to obtain a product, the product is frozen into a solid by using liquid nitrogen, the solid is placed in the freeze dryer to remove water, and pinacol generated in the reaction process is removed. After 1H-NMR spectrum identification is performed by a nuclear magnetic resonance spectrometer, a crude product DEA-protected boron ester compound (R-B (DEA)) is obtained. The stir bar is placed in the crude product R-B (DEA), and 0.1 M diethyl ether and a 0.1 M aqueous hydrochloric acid solution are added to react for 8 hours. After the reaction, the solution in the round-bottomed flask is poured into the separating funnel for extraction, an organic layer is cleaned with the saturated salt solution, and the water is removed with anhydrous magnesium sulfate, and then, the product is dissolved in a small amount of dichloromethane (DCM) after being concentrated under decompression, and then, added with n-hexane for recrystallization to react at a temperature of 0° C. for 8 hours, to obtain a tetraboronic acid compound.

Therefore, the second product containing the tetraboronic acid compound can be obtained by the Ugi reaction and the deprotection reaction through microwave heating assistance. Further, the tetraboronic acid compound has boronic acid functional groups of R1 to R4. R1 is 4-phenylboronic acid or 2-fluoro-4-phenylboronic acid, R2 is 4-phenylboronic acid, R3 is 3-phenylboronic acid, 4-phenylboronic acid, or 2-fluoro-5-phenylboronic acid, and R4 is 3-benzylboronic acid, 4-benzylboronic acid, or 2-fluoro-4-benzylboronic acid.

In the first embodiment, when the boronic acid functional group R1 of the tetraboronic acid compound is 4-phenylboronic acid, the boronic acid functional group R2 is 4-phenylboronic acid, and the boronic acid functional group R3 is 4-phenylboronic acid, the boronic acid functional group R4 is 3-benzylboronic acid or 4-benzylboronic acid. In the second embodiment, when the boronic acid functional group R1 of the tetraboronic acid compound is 4-phenylboronic acid, the boronic acid functional group R2 is 4-phenylboronic acid, and the boronic acid functional group R3 is 3-phenylboronic acid, the boronic acid functional group R4 is 4-phenylboronic acid. In the third embodiment, when the boronic acid functional group R1 of the tetraboronic acid compound is 4-phenylboronic acid, the boronic acid functional group R2 is 4-phenylboronic acid, and the boronic acid functional group R3 is 2-fluoro-5-phenylboronic acid, the boronic acid functional group R4 is 3-benzylboronic acid, 4-benzylboronic acid, or 2-fluoro-4-benzylboronic acid. In the fourth embodiment, when the boronic acid functional group R1 of the tetraboronic acid compound is 2-fluoro-4-phenylboronic acid, the boronic acid functional group R2 is 4-phenylboronic acid, and the boronic acid functional group R3 is 2-fluoro-5-phenylboronic acid, the boronic acid functional group R4 is 3-benzylboronic acid, 4-benzylboronic acid, or 2-fluoro-4-benzylboronic acid.

In some embodiments, at least one of the boronic acid functional groups R1 to R4 of the tetraboronic acid compound contains a $^{10}B$ isotope for use in BNCT, and the BNCT is primarily used for treating a head and neck cancer and an oral cancer. In other words, after the drug containing the tetraboronic acid compound is administered to a patient, the $^{10}B$ isotope can be excited into a $^{11}B$ isotope by irradiation of neutron beams, thereby releasing high energy to damage the tumor cells.

In some embodiments, a reagent containing the tetraboronic acid compound is in a dosage form of an oily solution or a solid.

Some examples and related experimental and analytical results are provided below.

In some examples, to obtain preferred experimental conditions, experiments such as solvent testing, reactant addition sequence, reaction temperature, and reaction time are performed. First, different solvents is compared by using trifluoroethanol, water, methanol, diethyl ether, and dichloromethane, and the reactants, that is, aniline, benzaldehyde, benzoic acid, and 2-(4-Isocyanophenyl)-4,4,5,5-tetramethyl-1,3,2-dioxaborolane are simultaneously mixed to be subjected to the Ugi reaction, the reaction temperature is a room temperature, the reaction time is 1 hour and the solvent concentration is 1 molar concentration, and the results are shown in Table 1.

TABLE 1

| Experimental groups | Solvents | Temperature (° C.) | Time (hours) | Concentration (molar concentration) | Yield (%) |
| --- | --- | --- | --- | --- | --- |
| 1 | Water | Room temperature | 1 | 1 | 62 |
| 2 | Diethyl ether | Room temperature | 1 | 1 | 65 |
| 3 | Dichloromethane | Room temperature | 1 | 1 | 46 |
| 4 | Methanol | Room temperature | 1 | 1 | 27 |
| 5 | Trifluoroethanol | Room temperature | 1 | 1 | 66 |

As shown in Table 1, when the solvent is trifluoroethanol (experimental group 5), the yield is higher, indicating that the polar protic solvent facilitates the reaction to be in a homogeneous state, resulting in an increase in a product yield.

Next, the reactant addition sequence is tested, and the aniline, benzaldehyde, benzoic acid, and 2-(4-Isocyanophenyl)-4,4,5,5-tetramethyl-1,3,2-dioxaborolane are dissolved in trifluoroethanol to be subjected to the Ugi reaction, the reaction temperature is a room temperature, the reaction time is 1 hour and the solvent concentration is 1 molar concentration. In the experimental group 5, the reactants are simultaneously added to the solvent to undergo the reaction, and in the experimental group 6, the aniline and benzaldehyde are firstly added and mixed in the solvent and stirred for 15 minutes, then the benzoic acid and 2-(4-Isocyanophenyl)-4,4,5,5-tetramethyl-1,3,2-dioxaborolane are added to undergo the Ugi reaction, and the results are shown in Table 2.

TABLE 2

| Experimental groups | Solvents | Temperature (° C.) | Time (hours) | Concentration (molar concentration) | Yield (%) |
| --- | --- | --- | --- | --- | --- |
| 5 | Trifluoroethanol | Room temperature | 1 | 1 | 66 |
| 6 | Trifluoroethanol | Room temperature | 1 | 1 | 71 |

As shown in Table 2, the yield of the experimental group 6 is 71% and higher than that of the experimental group 5, and it can be known that, if the amine and the aldehyde are added for reaction first and then the carboxylic acid and the isocyanide are added, the yield can be increased.

Other experimental conditions of the Ugi reaction, such as reaction time and reaction temperature, are further tested to find out the experimental conditions for optimizing the reaction, and the yield is used as a basis for judgment. In each experimental group, the aniline, benzaldehyde, benzoic acid, and 2-(4-Isocyanophenyl)-4,4,5,5-tetramethyl-1,3,2-dioxaborolane are sequentially dissolved in trifluoroethanol, the aniline and the benzaldehyde are firstly added to react and stirred for 15 minutes, then the benzoic acid and the 2-(4-Isocyanophenyl)-4,4,5,5-tetramethyl-1,3,2-dioxaborolane are added to undergo the Ugi reaction, and then in each experimental group, the experimental analysis is carried out according to different reaction temperatures (room temperature, 45° C., microwave heating 45° C., and microwave heating 65° C.), and different reaction times (1, 2, or 3 hours). The experimental conditions and yield results of each experimental group are shown in Table 3.

TABLE 3

| Experimental groups | Solvents | Temperature (° C.) | Time (hours) | Concentration (molar concentration) | Yield (%) |
| --- | --- | --- | --- | --- | --- |
| 6 | Trifluoroethanol | Room temperature | 1 | 1 | 71 |
| 7 | Trifluoroethanol | Room temperature | 2 | 1 | 87 |
| 8 | Trifluoroethanol | Room temperature | 3 | 1 | 54 |
| 9 | Trifluoroethanol | 45° C. | 2 | 1 | 88 |
| 10 | Trifluoroethanol | Microwave, 45° C. | 2 | 1 | 90 |

TABLE 3-continued

| Experimental groups | Solvents | Temperature (° C.) | Time (hours) | Concentration (molar concentration) | Yield (%) |
|---|---|---|---|---|---|
| 11 | Trifluoroethanol | Microwave, 65° C. | 2 | 1 | 93 |

As shown in Table 3, the experimental groups 6 to 11 use the trifluoroethanol as a solvent, the reaction temperatures of the experimental groups 6 to 8 are room temperature, and the test is carried out for different reaction times. It can be known from Table 3 that when the reaction time is 2 hours (experimental group 7), the yield is 87% and higher than those of the other two groups. After confirming the preferred reaction time (2 hours), the experiment is carried out at different reaction temperatures, and the reaction temperatures are respectively room temperature, 45° C., microwave heating 45° C. and microwave heating 65° C. as experimental conditions, the microwave heating is to use the focused microwave reactor (model: CEM Discover System-Benchmate) to undergo a microwave heating reaction. Comparing the experimental group 9 with the experimental group 10, the microwave heating helps to increase the yield when both the temperatures are 45° C. It can be known from the experimental groups 9 to 11 that when the reaction temperature is microwave heating 65° C. (experimental group 11), the yield reaches 93% and is higher than those of the other two groups.

Therefore, in the subsequent examples, the tetraboronic acid compound according to one embodiment of the present invention is processed under the experimental conditions of the experimental group 11.

In some examples, the amine containing the boron ester functional group X and the aldehyde containing the boron ester functional group Y are added with 1 M trifluoroethanol to be stirred and heated by microwave in the first microwave condition to form the first solution, the first microwave condition includes 60° C., 150 W, and a high rotating speed, and the stirring time of the step of stirring the first solution is 15 minutes. Next, the carboxylic acid containing the boron ester functional group A and the isocyanide containing the boron ester functional group Z are added to the first solution to form the second solution, and the second solution is heated by microwave in the second microwave condition to obtain the first product, and the first product has the tetraboronate ester compound, the boron ester functional group A is 4-phenylboronic acid pinacol ester or 2-fluoro-4-phenylboronic acid pinacol ester, the boron ester functional group X is phenylboronic acid pinacol ester, and the boron ester functional group Y is 3-phenylboronic acid pinacol ester, 4-phenylboronic acid pinacol ester or 2-fluoro-5-phenylboronic acid pinacol ester, and the boron ester functional group Z is 3-benzylboronic acid, 4-benzylboronic acid or 2-fluoro-4-benzylboronic acid.

The reaction is shown in the reaction Formula (i). In some examples, the tetraboronic acid compounds having different boron ester functional groups A, X, Y and Z are shown in Table 4.

TABLE 4

| Examples | Functional groups | | |
|---|---|---|---|
| | A | X | Y |
| A1 | 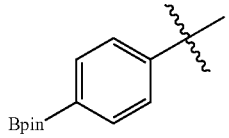 | 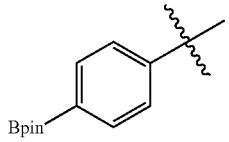 | 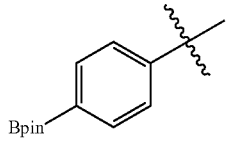 |
| A2 | 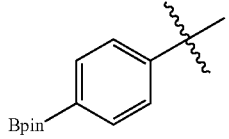 | 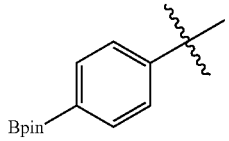 | 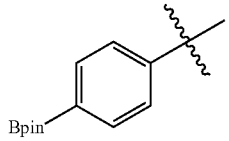 |
| A3 | 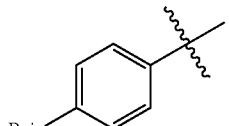 | 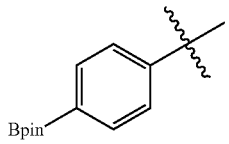 | 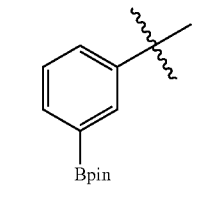 |
| A4 | 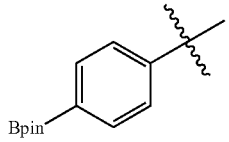 | 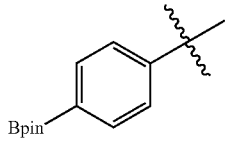 | 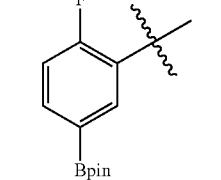 |

TABLE 4-continued
| | | | |
|---|---|---|---|
| A5 | 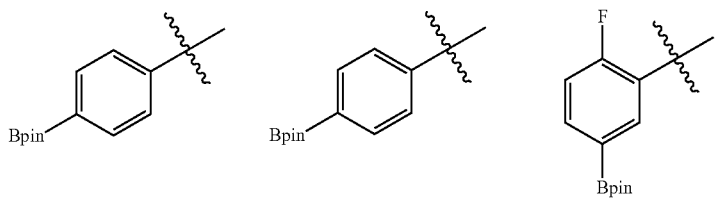 | | |
| A6 | 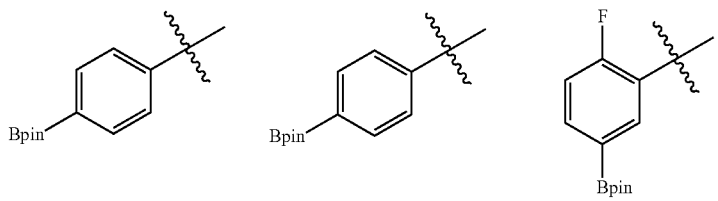 | | |
| A7 | 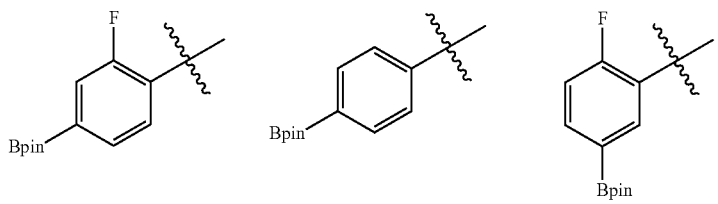 | | |
| A8 | 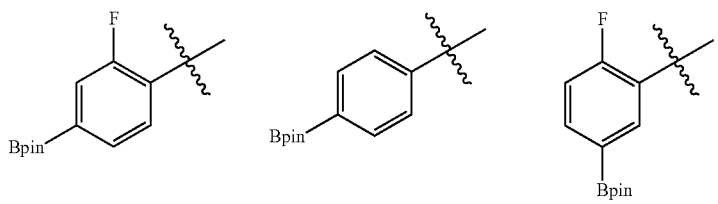 | | |
| A9 | 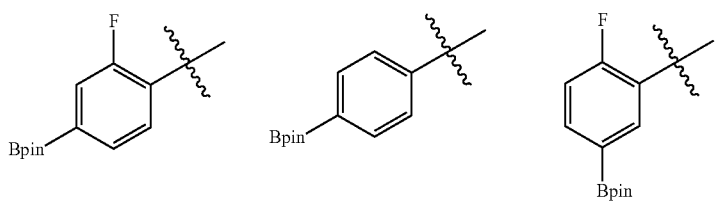 | | |
| | Functional groups | |
|---|---|---|
| Examples | Z | Yield (%) |
| A1 | 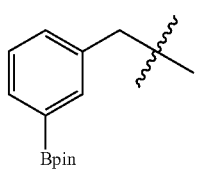 | 90 |
| A2 | 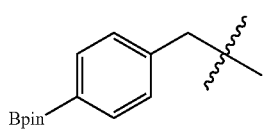 | 90 |
| A3 | 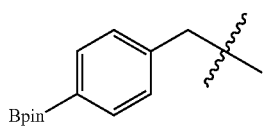 | 72 |

TABLE 4-continued

| | | Yield (%) |
|---|---|---|
| A4 | 3-Bpin-benzyl | 67 |
| A5 | 4-Bpin-benzyl | 61 |
| A6 | 2-F, 4-Bpin-benzyl | 94 |
| A7 | 3-Bpin-benzyl | 61 |
| A8 | 4-Bpin-benzyl | 79 |
| A9 | 2-F, 4-Bpin-benzyl | 53 |

As shown in Table 4, Examples A1 to A9 are composed of different boron ester functional groups A, X, Y, and Z, respectively, and the yields of different examples are related to the steric effects of the structures of the reactants. The yields of Examples A1, A2 and A6 are as high as 90%, and are related to absence of a fluorine atom on the amine having the boron ester functional group X and the aldehyde having the boron ester functional group Y, and the steric hindrance thereof is small, which is favorable for forming an intermediate product, imine, in the Ugi reaction. When the amount of the intermediate product is raised, the carboxylic acid having the boronate ester functional group A and the isocyanide having the boron ester functional group Z are further added, and the yield of the final product, the tetraboronate ester compound, is increased.

The tetraboronate ester compound in the first product is further extracted and purified. The first product is taken out and rinsed with dichloromethane, and the solvent is removed by a decompression concentrator (model: EYELA SB-1000, EYELA SB-1200), then the first product is dissolved in dichloromethane and poured into the separating funnel, and then the first product is extracted with the 1 M aqueous hydrochloric acid solution, the saturated aqueous sodium hydrogen carbonate solution, and the saturated salt solution respectively, the water is removed from the organic layer by anhydrous magnesium sulfate, then the first product is concentrated by the decompression concentrator, purified by short column chromatography (Dry Column Vacuum Chromatography) by using ethyl acetate and n-hexane as eluents (ethyl acetate:n-hexane=3:7; acetone:methanol=13:1), and finally ultrasonically vibrated with n-hexane to obtain the tetraboronate ester compound.

In some examples, the tetraboronate ester compound is subjected to the deprotection reaction with sodium periodate, water, and tetrahydrofuran to obtain the second product, and the second product contains the tetraboronic acid compound having the structure in Formula (I), the deprotection reaction is to heat by microwave in the third microwave condition, and the third microwave condition includes 45° C., 150 W, and a high rotating speed, and the reaction time is 30 minutes. The deprotection reaction is as shown in the reaction Formula (ii), and in some examples, the tetraboronic acid compounds having different boronic acid functional groups R1 to R4 are shown in Table 5.

TABLE 5

| Examples | Functional groups | | |
| --- | --- | --- | --- |
| | R1 | R2 | R3 |
| B1 | 4-(HO)₂B-C₆H₄- | 4-(HO)₂B-C₆H₄- | 4-(HO)₂B-C₆H₄- |
| B2 | 4-(HO)₂B-C₆H₄- | 4-(HO)₂B-C₆H₄- | 4-(HO)₂B-C₆H₄- |
| B3 | 4-(HO)₂B-C₆H₄- | 4-(HO)₂B-C₆H₄- | 3-(HO)₂B-C₆H₄- |
| B4 | 4-(HO)₂B-C₆H₄- | 4-(HO)₂B-C₆H₄- | 4-F, 3-B(OH)₂-C₆H₃- |
| B5 | 4-(HO)₂B-C₆H₄- | 4-(HO)₂B-C₆H₄- | 4-F, 3-B(OH)₂-C₆H₃- |
| B6 | 4-(HO)₂B-C₆H₄- | 4-(HO)₂B-C₆H₄- | 4-F, 3-B(OH)₂-C₆H₃- |
| B7 | 2-F, 4-(HO)₂B-C₆H₃- | 4-(HO)₂B-C₆H₄- | 4-F, 3-B(OH)₂-C₆H₃- |
| B8 | 2-F, 4-(HO)₂B-C₆H₃- | 4-(HO)₂B-C₆H₄- | 4-F, 3-B(OH)₂-C₆H₃- |

TABLE 5-continued

| | | | |
|---|---|---|---|
| B9 | 3-F, 4-linked, 5-B(OH)₂ phenyl | 4-(HO)₂B phenyl | 4-F, 3-B(OH)₂ phenyl |

| Examples | Functional groups R4 | Yield (%) |
|---|---|---|
| B1 | 3-B(OH)₂ benzyl | 72 |
| B2 | 4-(HO)₂B benzyl | 62 |
| B3 | 4-(HO)₂B benzyl | 82 |
| B4 | 3-B(OH)₂ benzyl | 43 |
| B5 | 4-(HO)₂B benzyl | 71 |
| B6 | 3-F, 4-benzyl, 5-(HO)₂B phenyl | 68 |
| B7 | 3-B(OH)₂ benzyl | 83 |

TABLE 5-continued

| | | |
|---|---|---|
| B8 | 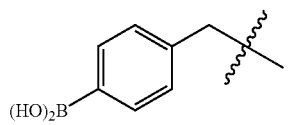 [SMILES: *Cc1ccc(B(O)O)cc1] | 54 |
| B9 | 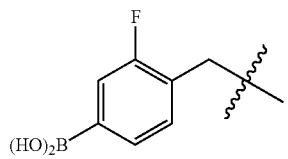 [SMILES: *Cc1ccc(B(O)O)cc1F] | 63 |

As shown in Table 4, Examples B1 to B9 are composed of different boronic acid functional groups R1 to R4 respectively, and it can be known from Table 4 that the yields of the tetraboronic acid compounds obtained by the deprotection reaction are not low.

The tetraboronic acid compound in the second product is further extracted and purified. The second product is added with the 1 M aqueous hydrochloric acid solution and the stir bar to react for 8 hours, then the second product is transferred to the separating funnel, and the aqueous layer is extracted with ethyl acetate and the organic layer is cleaned with the saturated salt solution to remove remaining sodium periodate. The organic layer is taken and added with anhydrous magnesium sulfate to remove water. After the solid is removed by suction filtration and the liquid is concentrated under decompression to remove the solvent, the second product is dissolved in methanol and added with water; after the solid is separated out, the second product is precipitated by centrifugation and the solid is removed by suction filtration. A filtrate is dried via the freeze dryer to obtain the tetraboronic acid compound.

The tetraboronic acid compound prepared by the preparation method is subjected to a biological experimental test for further discussing the application of the tetraboronic acid compound as a potential drug of the BNCT. Since the BNCT is mainly used for a head and neck cancer, the experiments are performed using osteosarcoma cell U2OS as a material.

By utilizing the characteristics that a fluorescence sensor (DAHMI) is stably bonded to boric acid, and a complex compound thereof can emit blue fluorescence, whether the tetraboronic acid compound enters cells or not is observed. The tetraboronic acid compound is firstly added to the osteosarcoma cells to act for 24 hours. Next, after the tetraboronic acid compound is washed away, the fluorescence sensor DAHMI is added and soaked for 20 minutes, and the cells are cleaned with phosphate buffered saline (PBS). Finally, the cell nuclei are stained with a TOTO™-3 dye or the mitochondria are stained with a Mito tracker Green FM dye, and the cells are observed under a fluorescence microscope (Model: Leica DM2500 & DM2500 LED Optical microscopes), and the results are shown in FIG. 2.

Figure 2:
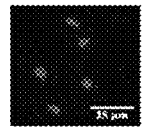
FIG. 2 is a cell fluorescence map of a tetraboronic acid compound entering osteosarcoma cells according to an embodiment of the present invention.

Referring to FIG. 2, FIG. 2 is a cell fluorescence micrograph of a tetraboronic acid compound entering osteosarcoma cells according to one embodiment of the present invention. The tetraboronic acid compounds in Examples B1 to B9 are respectively added to the osteosarcoma cells to act, and then act with the 1.0 mM fluorescence sensor DAHMI at a temperature 37° C. for 20 minutes. It can be seen from FIG. 2 that, the red fluorescence shows the position of the cell nucleus, while the blue fluorescence shows the position of the complex compound formed by the bonding of the tetraboronic acid compound to the fluorescence sensor DAHMI, and the combined image shows whether the tetraboronic acid compound enters the cell nucleus. Examples B1, B2, B3, and B9 have brighter fluorescence micrograph, indicating that the tetraboronic acid compounds in B1, B2, B3, and B9 enter the cell nucleus more easily than other compounds.

Figure 3:
FIG. 3 is a cell fluorescence map of a tetraboronic acid compound and a clinical drug BPA according to an embodiment of the present invention.

Referring to FIG. 3, FIG. 3 is a cell fluorescence micrograph of a tetraboronic acid compound and a clinical drug boronophenylalanine (BPA) according to one embodiment of the present invention. The blue fluorescence represents the position of the complex compound formed by the bonding of the tetraboronic acid compound to the fluorescence sensor DAHMI, the green fluorescence represents the position of the mitochondria in the cells, and the merged image shows whether the tetraboronic acid compound enters the mitochondria or not. FIG. 3 indicates that the fluorescence brightness level of the compounds in Examples B3 and B9 is higher than the brightness level of the clinical drug boronophenylalanine (BPA). The results indicate that B3 and B9 are more capable of accumulating in the mitochondria than clinical BPA.

The content of the boron atoms in the osteosarcoma cells is further analyzed, and the fluorescence sensor DAHMI in the cells is excited by a flow cytometer (Model: Thermo Fisher Scientific Attune™ NxT Flow Cytometer) to detect the fluorescence content, thereby analyzing the content of the boron compound bonded to the fluorescence sensor DAHMI. After the osteosarcoma cells are treated with the clinical drug boronophenylalanine (BPA), B3 and B9 respectively, the fluorescence content is detected by the flow cytometer. The results are shown in Table 6.

TABLE 6

| Boron compounds | Fluorescence content (A.u.) |
|---|---|
| BPA (2.0 mM) | 2473 |
| B3 (2.0 mM) | 4831 |
| B9 (2.0 mM) | 3568 |

As shown in Table 6, the fluorescence content of B3 is 1.95 times larger than that of the clinical drug boronophenylalanine, and the fluorescence content of B9 is 1.44 times larger than that of the clinical drug boronophenylalanine. Therefore, B3 and B9 have higher fluorescence content than the clinical drug boronophenylalanine. Therefore, the B3 and B9 compounds bonded to the fluorescence sensor DAHMI have higher boron atom content than the clinical drug boronophenylalanine.

In summary, the preparation method of the tetraboronic acid compounds provided by the present invention is suitable for preparing the tetraboronic acid compounds having the structure in Formula (I), and the reaction time can be shortened and the yield can be increased by the Ugi reaction and the deprotection reaction assisted by microwave heating, which is different from the conventional deprotection reaction applied to a boron ester functional group, and the microwave heating assistance can simultaneously subject the four boron ester functional groups to the deprotection reaction into boronic acid functional groups. Further, from the biological experimental analysis, it can be known that the tetraboronic acid compounds having the structure in Formula (I) in the present invention have higher boron atom content in the cells than the clinical drug boronophenylalanine.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A preparation method for a tetraboronic acid compound, comprising:
    mixing an aldehyde with an amine and dissolving in a solvent to obtain a first solution, wherein the amine has a protective group of R2, the protective group of R2 is phenylboronic acid pinacol ester, the aldehyde has a protective group of R3, and the protective group of R3 is 3-phenylboronic acid pinacol ester, 4-phenylboronic acid pinacol ester, or 2-fluoro-5-phenylboronic acid pinacol ester;

stirring the first solution;
adding a carboxylic acid and an isocyanide to the stirred first solution to obtain a second solution, wherein the carboxylic acid has a protective group of R1, the protective group of R1 is 4-phenylboronic acid pinacol ester or 2-fluoro-4-phenylboronic acid pinacol ester, and the isocyanide has a protective group of R4, and the protective group of R4 is 3-benzylboronic acid, 4-benzylboronic acid, or 2-fluoro-4-benzylboronic acid;
heating the second solution to obtain a first product;
extracting and purifying the first product to obtain a tetraboronate ester compound; and
conducting a deprotection reaction on the tetraboronate ester compound to obtain a second product, wherein the second product contains a tetraboronic acid compound, and the tetraboronic acid compound has a structure in Formula (I):

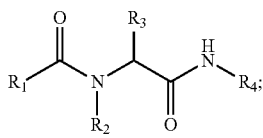
(I)

wherein R1 is 4-phenylboronic acid or 2-fluoro-4-phenylboronic acid, R2 is 4-phenylboronic acid, R3 is 3-phenylboronic acid, 4-phenylboronic acid, or 2-fluoro-5-phenylboronic acid, and R4 is 3-benzylboronic acid, 4-benzylboronic acid, or 2-fluoro-4-benzylboronic acid.

2. The preparation method according to claim 1, wherein stirring time of the step of stirring the first solution is 15 minutes.

3. The preparation method according to claim 2, wherein the step of stirring the first solution comprises: stirring the first solution under heating by microwave of a first microwave condition, wherein the first microwave condition comprises 60° C., 150 W, and a high rotating speed.

4. The preparation method according to claim 1, wherein reaction time of the step of heating the second solution is 1 to 2 hours.

5. The preparation method according to claim 4, wherein the step of heating the second solution comprises: heating the second solution by microwave of a second microwave condition, wherein the second microwave condition comprises 45° C. or 65° C., 150 W, and a high rotating speed.

6. The preparation method according to claim 1, wherein the step of extracting and purifying the first product comprises:
extracting the first product with an aqueous hydrochloric acid solution, a saturated aqueous sodium hydrogen carbonate solution, and a saturated salt solution respectively;
purifying the extracted first product by column chromatography using ethyl acetate and n-hexane as eluents; and
ultrasonically vibrating the purified first product with n-hexane to obtain the tetraboronate ester compound.

7. The preparation method according to claim 1, wherein the step of conducting a deprotection reaction comprises:
dissolving the tetraboronate ester compound and sodium periodate in water and tetrahydrofuran to form a mixed solution; and
heating the mixed solution by microwave to obtain the second product.

8. The preparation method according to claim 7, wherein the step of heating the mixed solution by microwave in the deprotection reaction comprises: heating in a third microwave condition, wherein the third microwave condition comprises 45° C., 150 W, and a high rotating speed, and reaction time of the deprotection reaction is 30 minutes.

9. The preparation method according to claim 1, wherein the step of conducting a deprotection reaction comprises:
dissolving the tetraboronate ester compound and potassium hydrogen fluoride in methanol and water to react to form a potassium organotrifluoroborate salt; and
dissolving silicon dioxide and the potassium organotrifluoroborate salt in ethyl acetate and water to undergo a hydrolysis reaction to obtain the second product.

10. The preparation method according to claim 1, wherein the step of conducting a deprotection reaction comprises:
mixing the tetraboronate ester compound, diethanolamine, and diethyl ether to undergo a reaction; and
adding the diethyl ether and an aqueous hydrochloric acid solution to undergo a hydrolysis reaction to obtain the second product.

11. The preparation method according to claim 1, wherein the solvent is one selected from the group consisting of trifluoroethanol, water, methanol, diethyl ether, and dichloromethane.

12. The preparation method according to claim 11, wherein the solvent is trifluoroethanol.

13. The preparation method according to claim 1, wherein at least one of the R1 to R4 of the tetraboronic acid compound contains a $^{10}$B isotope.

14. A tetraboronic acid compound, having a structure in Formula (I):

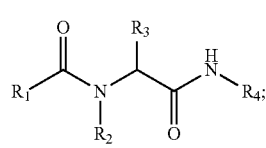
(I)

wherein R1 is 4-phenylboronic acid or 2-fluoro-4-phenylboronic acid, R2 is 4-phenylboronic acid, R3 is 3-phenylboronic acid, 4-phenylboronic acid or 2-fluoro-5-phenylboronic acid, and R4 is 3-benzylboronic acid, 4-benzylboronic acid, or 2-fluoro-4-benzylboronic acid.

15. The tetraboronic acid compound according to claim 14, wherein at least one of the R1 to R4 of the tetraboronic acid compound contains a 10B isotope.

16. The tetraboronic acid compound according to claim 15, wherein the tetraboronic acid compound is applied to a Boron Neutron Capture Therapy.

17. The tetraboronic acid compound according to claim 16, wherein the tetraboronic acid compound is applied to treatment of a cancer, and the cancer comprises an oral a cancer and a head and neck cancer.

18. The tetraboronic acid compound according to claim 14, wherein a dosage form of the tetraboronic acid compound is an oily solution or a solid.

* * * * *